Patented June 1, 1954

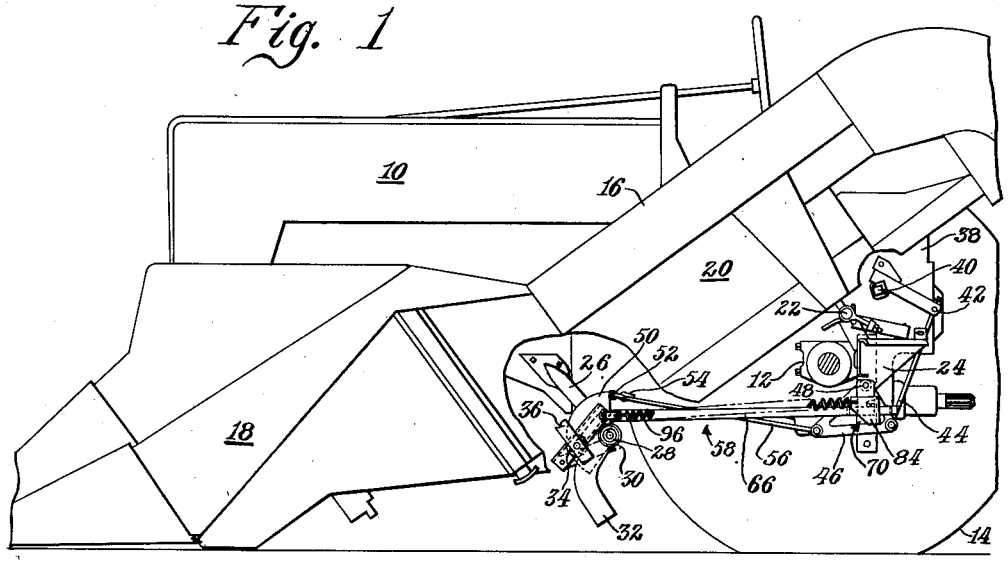

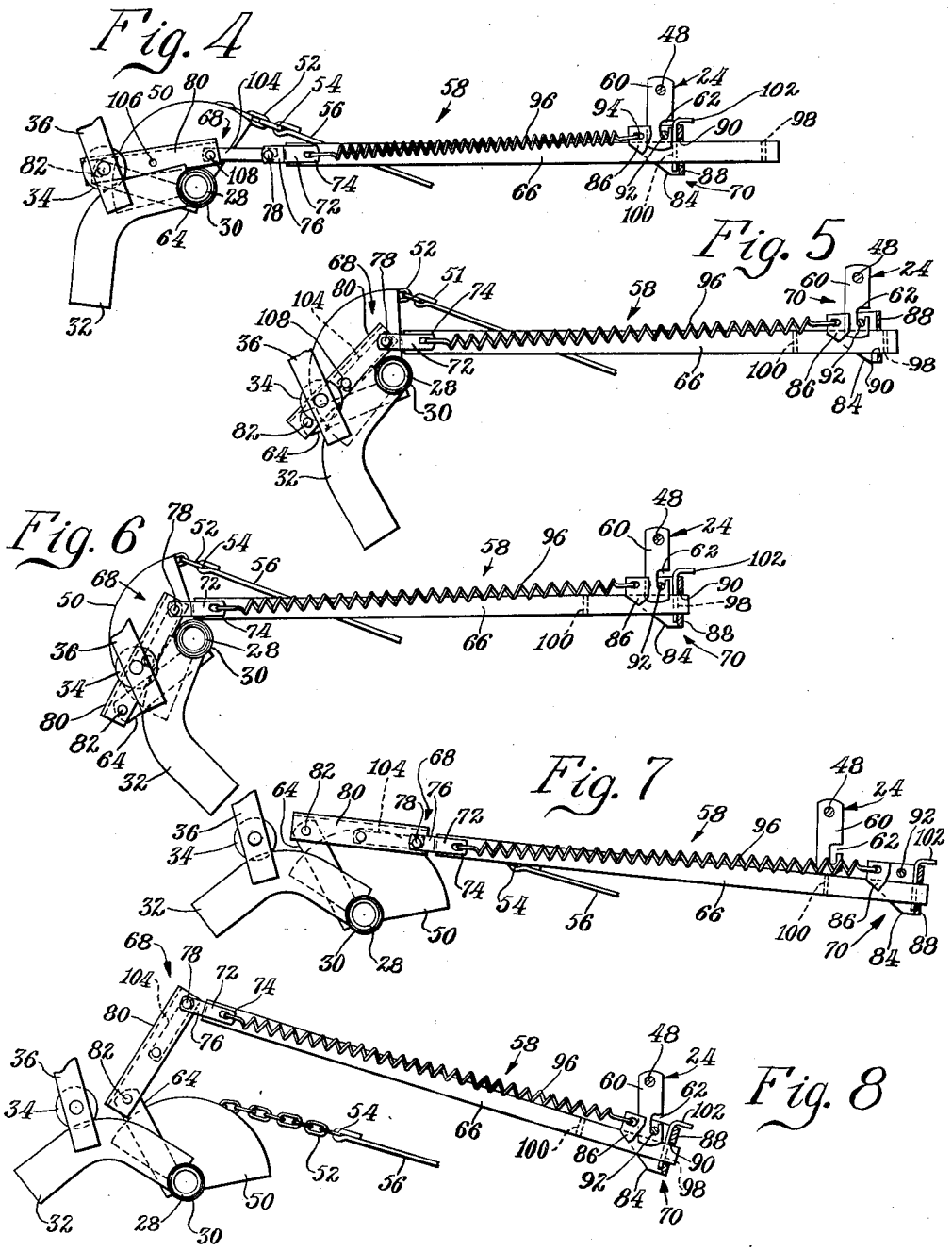

2,680,015

UNITED STATES PATENT OFFICE 2,680,015

COUNTERBALANCE MECHANISM

Norman F. Andrews, Ankeny, and Wayne E. Slavens and Evert W. Adolphson, Des Moines, Iowa, assignors to Deere Manufacturing Co., Dubuque, Iowa, a corporation of Iowa Application April 5, 1952, Serial No. 280,822

5 Claims. (Cl. 267—1)

This invention relates to counterbalance mechanism particularly useful in controlling agricultural machines or implements carried by tractors or similar vehicles.

The specific purpose of such mechanism in the general art referred to is to assist power means primarily in effecting raising or lowering of the implement relative to the field over which the machine is operating. For example, in a tractor-mounted corn picker, the machine may comprise one or more row units for gathering corn from rows planted in the field. Because of variations in ground contour for example, or when turning at the end of rows, it is necessary to elevate the gathering units relative to the ground and tractor. Counterbalancing means of various types have long been known in the agricultural machinery art. The present invention provides an improvement in such means and has for its principal object the provision of an arrangement in which the counterbalancing mechanism may be readily detached from its normal operating position without requiring the collapsing of the springs or other energy-storing means used.

Another object of the invention is to provide a counterbalancing mechanism assembly in which one or more springs are used and are normally connectible between a pair of relatively movable elements for exerting a biasing force, together with means for relieving one or the other of the elements of the force or load of the spring and transmitting this force or load to a rigid member in the form of a strut for retaining the springs in extended or semi-extended positions to facilitate removal and assembly of the counterbalancing mechanism as a unit relative to the machine. Still another object includes means providing for the installation or removal of one of the springs without detaching the counterbalancing mechanism as a unit from the associated machine.

The foregoing and other important objects and desirable features inherent in and encompassed by the invention will become apparent as a preferred embodiment of the invention is disclosed in detail in the ensuing description and accompanying sheets of drawings in which:

Figure 1 is a side view of a tractor-mounted corn picker, with portions of the near side omitted to expose one form of counterbalancing mechanism and its mounting relative to the machine;

Figures 2, 3 and 4 are enlarged views showing successive steps in the removal and replacement of one of the counterbalance springs;

Figures 5 through 8 are views drawn to the scale of Figures 2 through 4 and showing successive steps in the dismounting of the counterbalancing mechanism as a unit;

Figure 9 is an enlarged perspective view showing one of the connecting means for facilitating mounting and dismounting of the counterbalancing mechanism; and Figure 10 is an enlarged fragmentary view as seen substantially along the line 10—10 of Figure 2.

The agricultural machine chosen for the purposes of background illustration comprises a tractor having a longitudinal body 10 carried at its rear end on a transverse axle structure 12 and spaced apart traction wheels, only one of which appears at 14. The construction in this respect may be conventional and details may be disregarded. The tractor has mounted thereon, at least at one side thereof, a corn picker unit designated generally by the numeral 16 and comprising a forward gatherer unit 18 and a rearwardly and upwardly extending conveyor or first elevator 20. The lower side of the first elevator is pivotally mounted on a transverse pivot axis 22 provided by bracket structure 24 fixed to the rear axle structure 12. Here again, the details are relatively unimportant and all that is material here is that an implement or equivalent structure is pivotally mounted by the pivot means 22 or some equivalent means to a vehicle or similar support.

The tractor body 10 is provided intermediate its front and rear ends with a support 26 which includes a transverse pivot shaft or tilt pipe 28 on which is rockably carried a sleeve 30. Rigid on the sleeve is a forwardly and downwardly extending tilt arm 32 normally engaged by a roller 34 carried in a suitable bracket 36 comprising a rigid part of the gatherer 18. The general nature of the arrangement thus far described is such that rocking of the tilt sleeve 30 on the tilt pipe 28 operates through the tilt arm 32 to cause upward movement of the corn picker 16 about its pivotal mounting 22 on the rear axle structure 12 of the tractor. Downward movement of the corn picker about the pivot 22 is caused by the weight of the picker.

The tractor illustrated is of the type conventionally equipped at its rear end with a power lift housing 38 from which extends a transverse power-operated rockshaft 40. The power lift mechanism contained within the housing 38 may be of the type shown in U. S. Patent 2,532,552; or any other type of power-transmitting mechanism may be utilized. Of importance here is the representation of some form of means for imparting clockwise rotation to the tilt mechanism 30—50.

The rockshaft 40 has rigid thereon a rearwardly extending power arm 42 connected by a link 44 to a bell crank 46. This bell crank is pivoted at 48 to a depending part of the axle-mounted bracket structure 24. Rigid on the sleeve 30 is a sector 50 about which is wrapped a chain 52. One end of the chain is connected in any suitable manner to the forward or lower end of the sector and the free end of the chain is connected at 54 to the forward end of a link 56. The rear end of the link is connected to the bell crank 46. Activation of the power means in such manner that the rockshaft 40 is rocked in a counterclockwise direction results in clockwise rocking of the sector 50 and sleeve 30 to raise the picker about its pivot 22 on the tractor.

As indicated above, what has just been described is merely representative of basic structure to which the invention may be applied. The details of this basic structure may be altered to suit individual desires. For the present purposes, no importance may be attached to the specific form of the background structure.

As is conventional, the power lift means may be supplemented by counterbalance mechanism. The mechanism forming the basis of the present invention is designated generally by the numeral 58 and comprises the parts to be subsequently set forth.

The axle-mounted bracket structure 24 has a depending portion which, as previously described, provides the pivot 48 for the bell crank 46. In addition, this bracket structure has a pair of spaced depending parts 60, each of which is provided with an angular slot 62 (Figure 9). The structure 24—60 provides one of a pair of mounting or attaching elements, the tilt means 30—50 constituting the other. The structure 24—60 is fixed relative to the tractor, whereas the structure or element 30—50 is movable relative to the tractor. Consequently, the two elements are relatively movable as respects each other. It is between these two elements that the counterbalancing mechanism is effective. Stated otherwise, the element 24—60 is attached to the same basic support as the power lift means 38—46 and the power lift means and the counterbalance unit operate in parallel to cause clockwise rocking of the tilt element 30—50. The element 30—50 additionally includes rigid therewith an attaching arm 64 to which the forward end of the counterbalancing means 58 may be secured. This arm is provided merely as a convenient mounting for the counterbalance means, which could as well be attached to either the sector 50 or the tilt arm 32 except for certain operational characteristics not material here.

The counterbalance unit comprises an elongated rigid member or strut 66, preferably of cylindrical tubular section. This strut has its opposite ends positionable respectively adjacent to the elements 30—50 and 24—60. Attaching means, designated generally by the numeral 68 is provided for attaching the forward or left-hand end of the strut to the element 30—50; and second attaching means, designated generally by the numeral 70, is provided for supporting or attaching the other end of the strut to the element 24—60.

The first attaching means preferably comprises a pair of members 72 rigidly secured to the forward end of the strut, as by welding, and respectively having apertured ears 74 and 76. The apertured ears 76 are alined to receive a removable attaching member in the form of a pin 78, which passes also through the apertured rear end of a link 80. The forward end of this link is connected by a removable pin 82 to the free end of the arm 64 on the tilt element 30—50.

The second attaching means comprises a bracket in the form of a strut guide 84 having a pair of forwardly extending leg portions 86 rigidly cross-connected by a transverse portion 88 in which is provided a circular aperture 90 through which the rear end portion of the strut 66 is normally slidable. The bracket or strut guide 84 comprises a detachable member which is removably associated with the element 24—60 by means of a cross pin 92 receivable by and removable from the angular slots 62 in the bracket portions 60 (Figure 9). Each of the leg portions 86 of the strut guide 84 is apertured at 94 and these apertured portions are respectively in longitudinal alinement with the apertured ears 74 of the bracket means 72 at the forward end of the strut 66. Biasing means, preferably in the form of a pair of coiled tension springs 96, is connected between the brackets 72 and 84, the front ends of the springs comprising connector portions and being hooked into the apertured ears 74 of the bracket members 72 and the rear portions similiarly comprising connectors or hooked ends connected to the strut guide 84 via the apertures 94.

When the counterbalancing means 58 is connected between the elements 30—50 and 24—60 to implement the force exerted by the power lift means, the bias of the springs establishes a force or load exerted between the bracket or connector means 72 and the bracket or connector means established by the strut guide 84 as connected to the element 24—60 via the cross pin 92. As the tilt means or element 30—50 rocks or moves relative to the fixed element 24—60, the strut 66 is slidably sustained by the transverse apertured portion 88 of the strut guide 84 and, apart from the friction that might develop in the bearing at 66—90, the springs 96 function as ordinary counterbalance or assist means. This is the situation that will obtain with the counterbalance means arranged as in Figures 1 and 2. The strut 66 is, of course, of sufficient length to prevent accidental disengagement thereof from the strut guide 84.

The strut is provided adjacent its rear end with a pair of openings or apertures 98 and 100, either of which may selectively receive a retaining or locking pin 102 (Figures 4 through 8). These openings are spaced apart lengthwise of the strut and extend transverse to the length of the strut and, together with the pin 102, cooperate selectively with the transverse portion 88 of the strut guide 84 to provide means for locking the strut and strut guide together against movement relative to each other. Stated otherwise, the parts provide selectively cooperative stop portions for purposes to presently appear. During normal operation of the machine and in order to obtain the full effect of the counterbalance means, the pin 102 is not carried in either of the openings 98 or 100 but is or may be carried elsewhere on the machine. Of course, in the absence of the pin 102, any other suitable tool or implement may be used.

The connection of the front end of the strut 66 to the element 30—50 includes extension means whereby the length of the strut may be increased. As will appear below, increase in length of the strut results in a projection of the rear end of the strut a greater distance rearwardly through the openings 90 in the strut guide 84. The extension means comprises a second link 104 (in addition to the previously described link 80) having opposite apertured ends. This link is approximately one-half the length of, or at any rate is shorter than, the link 80 and is normally carried in the position shown in Figure 2, with its rear end pivotally connected to both the link 80 and the front strut bracket 72 by means of the previously described removable pin 78. The link 80 has an aperture 106 intermediate its ends (Figure 3) and this aperture may normally receive securing means in the form of a removable pin 108 (Figure 2) which passes also through the forward apertured end of the link 104. Since the link 104 is normally stored in the position of Figure 2, it may be termed a storage link and is retained by the pins 78 and 108. When this storage link is used to effect an extension of the length of the strut 66 (Figure 3) it is interconnected between the front strut bracket 72 and the rear end of the link 80. The removable pins 78 and 108 may be used.

It has been previously stated that during normal operation the strut 66 is free to slide fore and aft through the strut bracket or guide 84 and that the counterbalance means in that situation operates in parallel with the power lift means on the tractor for raising the picker about its pivotal connection at 22. During this phase of the use of the counterbalance means, the strut guide or bracket 84 may be considered an integral, albeit removable, part of the tractor-carried element 24—60 and the general effect of the counterbalance means would be no different from the conventional means ordinarily used for counterbalance or assist purposes.

Figures 2, 3 and 4 illustrate what is involved in the replacement of a counterbalance spring. The power lift means on the tractor is first actuated to rock the tilt element 30—50 to the position of Figure 2, at which time the forward opening 100 in the strut 66 will be just ahead of the transverse portion 88 of the strut guide 84. The pin 102 is inserted through the opening 100, which means that the strut guide and strut are locked together, at least to the extent that the strut guide cannot move forwardly relative to the strut (or the strut cannot move rearwardly relative to the strut guide). This temporary interengagement between the strut and the strut guide provides for relieving the strut bracket connecting pin 92 of the load or force of the spring or springs 96 (considering now that two springs are used as illustrated). In other words, the tension or load of the springs is transferred to the strut and is no longer effective between the elements 24—60 and 30—50. Accordingly, the load is also taken off of the removable pin 78. This pin and the pin 108 may then be removed to free the storage link 104 and this link may then be used to establish an extended connection between the front strut bracket 72 and the rear apertured end of the link 80 (Figure 4). The length of the strut is thus increased by the length of the link 104, which enables the tilt element 30—50 to be rocked in a counterclockwise direction to the position of Figure 4. Since the strut 66 is locked to the strut guide 84 by the pin 102, the springs 96 cannot disturb the position of the front strut bracket 72 and counterclockwise rocking of the tilt element 30—50 is effected until the distance between the rear end of the link 80 and the front strut bracket 72 equals the distance between the apertured ends of the storage link 104, whereupon the connection as shown in Figure 4 and as just described can be made.

The procedure thus far described results in a partial relaxation of the springs 96, but sufficient energy is still stored therein to prevent ready removal thereof.

With the storage or extension link 104 in place as shown in Figure 4, the pin 102 can be removed from the forward opening or aperture 100 in the strut 66 and the tilt element 30—50 may be rocked further in a clockwise direction until it attains the position shown in Figure 3. The springs 96 will then be completely relaxed and may be readily unhooked between the brackets 72 and 84. If the reason for following the procedure just outlined involves the replacing of one or both of the springs, then the new springs may be inserted in place of the old spring or springs and the procedure reversed to restore the counterbalance means to its normal condition. Briefly, this procedure is carried out as follows, starting with the position shown in Figure 3. The tilt element 30—50 is rocked in a counterclockwise direction (because of the weight of the corn picker) until the forward opening 100 is just ahead of the transverse portion 88 of the strut guide or bracket 84. The pin 102 is inserted, which locks the strut to the strut guide and permits the removal of the pins 78 and 108. The springs will at this time be partly stretched and they cannot, of course, collapse while the extension link 104 is being removed. The tilt element 30—50 is then rocked in a clockwise direction to bring the rear aperture of the link 80 in register with the apertured ears 76 of the front strut bracket 72 and a connection is made by the pin 78. The extension link 104 may be stored by means of the pin 78 and the pin 108, as before. The condition of the parts will then be as seen in Figure 2, but the pin 102 will still be in place. This pin may now be removed and the counterbalance means is available for normal use.

Figures 5 through 8 illustrate the procedure to be followed in removing the counterbalance means as a unit from the corn picker and tractor. Figure 5 shows the normal operating position in which the strut 66 is free to slide relative to the strut guide 84. The corn picker is lowered slightly about its pivot 22 to cause the tilt element 30—50 to move in a counterclockwise direction to the position of Figure 6, whereupon the rear opening 98 in the strut becomes positioned just ahead of the transverse portion 88 of the strut guide 84. The pin 102 can be inserted for locking the strut guide to the strut and thus transferring the load of the springs from the element 24—60 to the strut. The counterbalance assembly 58 may be removed as a unit in either of two ways. For example, the tilt element 30—50 may be rocked in a clockwise direction. If the strut 66 is raised slightly to disengage the pin 92 from the bottom of the angular slots 62 in the support portions 60, the position of Figure 7 will be achieved. The pin 78 may then be removed to disconnect the front end of the counterbalance assembly 58 from the link 80.

The alternate method of removal involves first the locking of the strut to the strut guide by means of the pin 102 as shown in Figure 6. The tilt element 30—50 may be rocked slightly to remove the weight load from the pin 78, whereupon the pin 78 may be removed and the entire assembly 58 lifted upwardly and then moved rearwardly by hand to disengage the pin 92 from the slots 62.

Figure 8 shows what may be involved in reassembling the counterbalance assembly 58. If the corn picker is in a raised position, which will require that the tilt element 30—50 be rocked to the position shown in Figure 8, advantage may be taken of the pivotal connection at 78 between the assembly 58 and the link 80. That is to say, the rear end of the assembly 58 may be connected to the bracket or support 24 by means of the pin 92 and the slots 62. Although the distance between the element 24—60 and the rear end of the link 80 is shorter than the length of the counterbalance assembly, the link 80 may be pivoted upwardly as shown in Figure 8 so that the pin 78 may be replaced. The linkage or toggle arrangement between the parts 66 and 80 as just described provides in effect a lost-motion connection between the assembly 58 and the tilt element 30—50. Since the springs 96 operate in tension between the element 24—60 and the front end of the strut, which is behind the pivotal connection 78, the lost motion does not interfere with normal operation of the counterbalance means.

Various features of the invention not specifically enumerated will undoubtedly occur to those versed in the art, as likewise will numerous modifications and alterations in the preferred embodiment of the invention illustrated and described, all of which may be achieved without departing from the spirit and scope of the invention.

What is claimed is:

1. Counterbalance mechanism of the character described, comprising: a strut having first and second spaced apart ends; a bracket carried by the strut at its first end for movement lengthwise of the strut; spring means connected between the second end of the strut and the bracket and tending to move the bracket lengthwise of the strut; selectively engageable and disengageable means cooperative between the strut and bracket for holding the bracket against such movement; means on the bracket for connecting the bracket to a support or the like; and means at the second end of the strut for connecting said second end of the strut to another support or the like, including first and second links of different lengths detachably connected to the second end of the strut and selectively arrangeable in parallel and in series to vary the length of the strut.

2. Counterbalance mechanism of the character described, comprising: a strut having first and second spaced apart ends; a bracket carried by the strut at its first end for movement lengthwise of the strut; spring means connected between the second end of the strut and the bracket and tending to move the bracket lengthwise of the strut; selectively engageable and disengageable means cooperative between the strut and bracket for holding the bracket against such movement; means on the bracket for connecting the bracket to a support or the like; a first link having opposite apertured ends and formed with an aperture intermediate its ends; means detachably securing one apertured end of said link to the second end of the strut, leaving the other end of said link free for attachment to a support or the like; a second and shorter link having opposite apertured ends spaced apart on the order of the spacing between the strut-connected end and the intermediate aperture of the first link, said second link being connectible to the second end of the strut by the foresaid detachable means so that its free end registers with the intermediate aperture of the first link; and detachable means cooperative with the two links via the registering apertures for disconnectibly securing the links together in side-by-side relationship.

3. In counterbalance mechanism having a fore-and-aft extending frame, a movable element carried by the frame, and an elongated strut having a front end portion connected to the movable element and a rear end portion spaced rearwardly from the movable element and below the frame, the improvement residing in means for attaching the rear end of the strut to the frame, comprising: a fixed element secured to the frame and having side parts spaced transversely of the length of the strut and depending respectively at opposite sides of the rear end portion of the strut to receive said rear end portion freely therebetween, each of said side parts having an angular slot including a rearwardly opening portion and a depending reentrant portion; a strut guide in the form of a U having a bight transverse to the length of the strut and a pair of legs spaced apart to extend respectively along the side parts of the fixed element, said bight being apertured to loosely receive the rear end portion of the strut, and a transverse connecting pin carried by and between the legs of the strut guide and received by the slots in the side parts of the fixed element; a pair of tension springs, one at each side of and extending along the strut, connected at their front ends to the front portion of the strut and connected at their rear ends respectively to the legs of the strut guide; and the rear end portion of the strut having a vertical aperture therein positionable just ahead of the bight of the strut guide, when the springs are stretched, to receive a pin or the like to be abutted by said bight for holding the springs in stretched condition to permit upward and rearward disengagement of the strut guide pin from the angular slots in the side parts of the fixed element.

4. In counterbalance mechanism having a fore-and-aft extending frame, a movable element carried by the frame, and an elongated strut having a front end portion connected to the movable element and a rear end portion spaced rearwardly from the movable element and below the frame, the improvement residing in means for attaching the rear end of the strut to the frame, comprising: a fixed element secured to the frame and depending alongside one side of the rear end portion of the strut to receive said rear end portion freely therebetween, said fixed element having an angular slot including a rearwardly opening portion and a depending reentrant portion; a strut guide portion transverse to the length of the strut and a leg portion extending alongside the fixed element, said transverse portion being apertured to loosely receive the rear end portion of the strut, and a transverse connecting pin carried by the leg portion of the strut guide and received by the slot in the fixed element; a tension spring extending alongside the strut and connected at its front end to the front portion of the strut and connected at its rear end to the leg portion of the strut guide; and the rear end portion of the strut having a vertical aperture therein positionable just ahead of the transverse portion of the strut guide, when the spring is stretched, to receive a pin or the like to be abutted by said transverse portion for holding the spring in stretched condition to permit upward and rearward disengagement of the strut guide pin from the angular slot in the fixed element.

5. Counterbalance mechanism removably connectible between first and second spaced apart and relatively movable elements, comprising: an elongated strut having first and second spaced apart ends positionable respectively adjacent to the elements; first attaching means on the strut and connectible to the first element for affixing the first end of the strut to the first element for movement together; second attaching means for positioning the second end of the strut adjacent to the second element and including a strut guide detachably engaging the second element and slidably associated with the second end of the strut to guide the strut for movement relative to said second element as the strut moves with the first element; a tension spring extending lengthwise of the strut and having at one end a first force-transmitting connection with the first end of the strut and having at its other end a second force-transmitting connection to the strut guide so as to normally exert a tensional force between the first and second elements via the strut guide; normally disengaged means selectively interengageable between the strut and the strut guide for locking the strut and the strut guide together against tension of the spring to prevent collapse of the spring when the strut guide is detached from the second element; and said first attaching means including a normally idle extension link connectible between the first end of the strut and the first element to provide for increasing the distance between the elements while the strut is locked to the strut guide.

References Cited in the file of this patent

UNITED STATES PATENTS

| Number | Name | Date |
|---|---|---|
| 1,933,535 | Apel | Nov. 7, 1933 |
| 2,452,153 | Ronning et al. | Oct. 26, 1948 |
| 2,509,357 | Krause | May 30, 1950 |